United States Patent Office 2,954,389
Patented Sept. 27, 1960

2,954,389

PREPARATION OF TRIMETHYLALUMINUM

John F. Nobis, Cincinnati, and Charles E. Frank, Kenwood, Ohio, and William F. McFadyen, Tuscola, Ill., assignors to National Distillers and Chemical Corporation, a corporation of Virginia No Drawing. Filed Jan. 18, 1957, Ser. No. 634,820

10 Claims. (Cl. 260—448)

The present invention relates to a process for preparation of trimethylaluminum and, more particularly, to a process for reaction of sodium with methylaluminum halides under conditions to produce substantially pure trimethylaluminum in relatively high yields.

Those skilled in the art are aware that alkylaluminum halides, i.e., mixtures of alkylaluminum dihalides and dialkyl aluminum monohalides can be produced from metallic aluminum and alkyl halides as, for example, in accordance with the following reaction:

$$2Al + 3CH_3Cl = AlCl_2CH_3 + AlCl(CH_3)_2$$

Such a reaction is, for example, disclosed generically by Grosse nad Mavity in the Journal of Organic Chemistry, 5 (1940), pages 106–121. Moreover, those skilled in the art are aware of disclosures, including the aforesaid Grosse and Mavity article, relating to direct preparation of dialkylaluminum halides by reaction of an alkyl halide with an aluminum-magnesium alloy or by treating the sesquihalide with an alkali metal in which case metallic aluminum is precipitated and the monoalkylaluminum compound is converted to the dialkyl aluminum halide. From such organoaluminum halides as, for example, methyl aluminum chlorides including the aforesaid methyl aluminum sesquihalides and dimethylaluminum chloride, trialkylaluminum can be prepared by reacting the organoaluminum chloride with sodium. Thus, for such a conversion to trialkylaluminum, one method comprises the initial refluxing of alkylaluminum sesquichlorides with sodium ribbon followed by treatment of the resulting impure trialkylaluminum with a liquid sodium-potassium alloy, the latter treatment being essential as use of sodium alone, under the disclosed reaction conditions, becomes coated with a hard crust of by-product aluminum thereby preventing substantial completion of reaction and decreasing the rate of reaction.

The primary object of this invention is to provide a process carried out under controlled conditions whereby sodium is reacted with methylaluminum halides to produce trimethylaluminum in relatively high yields and substantially devoid of unreacted halides and/or undesired decomposition products of the methyl aluminum halide reactant. Another object is the provision of such a process whereby to substantially completely react the methyl aluminum chloride to a large yield of the desired trimethylaluminum product recoverable as a distillate without substantial, if any, contamination by unreacted methylaluminum chloride or by-products thereof that may be formed in the reaction between sodium and the methylaluminum chloride. A still further object is the provision of such a process that can be carried out in batch-wise, semi-batch-wise or continuous manner in which (1) the sodium-methylaluminum chloride reaction is initially carried out to form the trimethylaluminum followed by recovery of the latter or (2) simultaneously recovering the trimethylaluminum product by distillation as it is formed in the sodium-methylaluminum chloride reaction.

The process embodied herein comprises reacting sodium with a methylaluminum chloride, and particularly methylaluminum sesquihalides, utilizing a controlled excess of sodium and a relatively high but controlled reaction temperature of up to about 250° C. and, more specifically a temperature of above the boiling point of the methylaluminum halide reactant and trimethyl aluminum product to about 250° C., e.g., from about 125 to about 250° C. As is more specifically set forth hereinafter, practice of the process embodied herein results in rapid production of trimethylaluminum in high yields and substantially pure form thereby making unnecessary the use of treatments such as with a liquid sodium-potassium alloy and even with which lower yields of trimethylaluminum are generally obtained than result from practice of this invention. Moreover, practice of this invention enables the production of substantially pure trimethylaluminum in high yields by direct conversion of methylaluminum sesquichlorides as prepared, and which can contain unreacted aluminum, thereby making it unnecessary to separate the sesquichlorides into individual components and utilize only the dimethyl aluminum chloride for conversion to trimethylaluminum.

With reference to the sodium reactant, the process embodied herein is carried out using an excess amount of sodium over that theoretically required to convert all of the methylaluminum chloride to trimethylaluminum but in an amount not substantially in excess of about 20% as higher amounts results in loss of yield. In preferred embodiment, the sodium is used in an amount of from more than one to about ten percent in excess and preferably, from five to ten percent, over that theoretically required to convert the methylaluminum chloride to trimethylaluminum.

For preparation of trimethylaluminum of substantially high purity and in high yields by the process embodied herein, the sodium reactant is desirably employed in a highly dispersed form, preferably as particles of less than about 50 microns in size. Thus, the sodium reactant can be used as a coating on finely divided particles of a solid that is inert to the reaction and, for example, as a coating on a substance that is a by-product (e.g., sodium chloride) of the reaction between the sodium and methylaluminum chloride, as a coating on unreacted particles of aluminum from a process utilizing finely divided aluminum for preparation of the methylaluminum chloride, etc. In specific embodiments, the sodium reactant is employed as a coating on finely divided particles of sodium chloride which may be preformed by agitating a mass of finely divided sodium chloride in mixture with sodium at a temperature above the melting point of sodium whereby molten sodium coats the sodium chloride particles, or molten sodium can be added to the reaction for formation of trimethylaluminum in which case the sodium coats the by-product salt formed in the reaction. Thus, the process embodied herein can be started with preformed sodium-coated particles of an inert solid, examples of which include sodium chloride, sodium sulfate, sand, titania, zirconia, carbon, and others, or, as aforesaid, by in situ formation of finely dispersed sodium by addition of molten sodium to the reaction between sodium and the methylaluminum chloride whereby the sodium coats the by-product salt as it forms in the reaction. In still other embodiments, the sodium can be used in the form of finely dispersed particles in an inert substance that is liquid under the reaction temperature employed. For such usage, inert substances such as mineral oils, waxes, etc. may be used which preferably have a higher boiling point than trimethylaluminum whereby distillation of the reaction product for recovery of trimethylaluminum is suitably effected without contamination with the dispersant medium for the sodium particles. For such an embodiment, the process can be started by use of a mass of finely divided sodium chloride or mixtures thereof with finely divided aluminum and adding thereto a high boiling liquid in which finely divided sodium is dispersed to provide a slurry to which the methylaluminum chloride reactant is added. By such a method, the process is carried out under conditions of excellent heat transfer and highly desirable improved mixing and contact between the sodium and methylaluminum chloride reactants.

As aforesaid, the process can be carried out as a batch or semi-batch operation in which the trimethylaluminum is initially formed and recovered in a separate distillation step or in a simultaneous operation wherein the trimethylaluminum is distilled as it forms. In the two step operation, the initial reaction is carried out at a temperature preferably above 130° C. to up to about 250° C., while preventing distillation of the resulting trimethylaluminum, followed by distilling the resulting product, e.g., at from about 120 to 125° C. to recover substantially pure trimethylaluminum as a distillate. On the other hand, and in a preferred embodiment, the process is carried out at a temperature above about 125° C. but not exceeding about 250° C. in a reactor equipped with a distillation column whereby the trimethylaluminum is distilled over as it forms.

In a batch-wise operation, the process embodied herein can be carried out by adding the methylaluminum chloride to a closed reaction zone in which is present the sodium reactant in a form, for example, as a coating on finely divided particles of an inert solid and the reaction carried out at an elevated temperature up to about 250° C. followed by, upon completion of the reaction, distilling the trimethylaluminum from the reaction mixture at a temperature of about 120 to 125° C. Preferably, however, the reaction is carried out in a reactor provided with a distillation column, at above about 125° C. but below about 250° C. whereby the trimethylaluminum distills over as it is formed.

In a semi-batch operation, a mass of finely divided particles of a solid by-product from a previous reaction, such as embodied herein, is admixed with sodium and the particles coated with sodium added as molten sodium, or by admixing the particles with sodium at a temperature above the melting point of sodium. The reaction is then carried out by addition of the methyl-aluminum chloride and use of temperatures as defined in the aforesaid batch operation to either preform the trimethylaluminum followed by distillation thereof, or to simultaneously distill the trimethylaluminum as it forms.

In a continuous operation, using a reactor provided with a distillation column, sodium and the methylaluminum chloride are continuously added through separate feed inlets into the reactor in which a temperature of above about 125° C. but below about 250° C. is maintained whereby the trimethylaluminum is distilled off as it forms and by-products of the reaction are continuously removed from the reactor.

Irrespective of whether or not the process embodied herein is carried out in batch-wise, semi-batch-wise or continuous manner, a similar reactor can be employed equipped with an agitator designed to scrape the reactor walls and a distillation column. For the operations wherein it is desired to initially react the sodium and the methylaluminum chloride and subsequently distill off the trimethylaluminum product, cooling means are employed for the distillation column so as to prevent distilling off reaction product during methylaluminum chloride addition to the reactor. Additionally, the reactor is provided with cooling means to cool the vessel walls for control of the reaction temperature during addition of the methylaluminum chloride.

In order to more fully describe the invention, several embodiments thereof are set forth hereinafter along with several runs carried out under conditions of temperature and/or sodium:methylaluminum chloride concentrations outside the scope of the process embodied herein for purposes of comparison to illustrate the marked improvement in product yield of improved quality provided by practice of this invention.

In the examples set forth hereinafter, and for purposes of illustration and not limitation, methylaluminum sesquichlorides were employed that were prepared as follows:

PREPARATION OF METHYLALUMINUM SESQUICHLORIDES

To a one liter, three-neck, round bottom flask equipped with a metal sweep stirrer, metal thermometer, condenser and gas inlet tube, the following was charged: 600 grams aluminum pellets and 0.1 mole of methyl sesquichlorides (catalyst). The stirred flask was externally heated to bring the temperature up to 90° C. and methyl chloride gas was charged into the flask through a calibrated rotameter. The reaction was very exothermic and a cooling bath was necessary to maintain the temperature between 90° C. and 120° C. Absorption of the methylchloride was very rapid and feed rates varied between 0.2 l./min. to 0.6 l./min. depending upon the temperature. The percent absorption was determined from the measured "off-gases." The gas feed was continued until the reactor was full and then the product was pumped from the reactor through a screened decanting leg using dry nitrogen pressure. A production rate of 0.2 lb./hr. was realized. The yield was 91% based on methylchloride charged and 95% based on aluminum used.

Analysis of the sesquichlorides showed the chloride content to be 51.6% (theory=52%); and the aluminum content averaged between 24–26% (theory=26.3%), thus indicating that the ratio of the methylaluminum dichloride to dimethylaluminum chloride was about 1:1.

Example 1

This example illustrates that a reaction of the type embodied herein but in which an excess of sodium is not used results in production of trimethylaluminum which, though obtained in relatively high yield, is contaminated by a relatively high amount of by-product chlorides.

A one-liter, three-necked, round bottomed flask equipped with an anchor-type stirrer, a thermometer, a graduated dropping funnel, a condenser and a receiver was charged with 350 grams of salt and 1.9 gram atom of sodium. The vessel contents were heated to 110° C. to melt the sodium, following which the agitator was started whereby the sodium coated the dry salt thus forming sodium-coated particles in the range of 1–20 microns. A stoichiometric quantity (0.65 mole) of methylaluminum sesquichlorides was then slowly added over a 30 minute period while the vessel contents were held at a temperature of 150–175° C. by use of a cooling bath, and the condenser was maintained sufficiently cool to prevent distillation of by-product trimethylaluminum (B.P. 120–122° C.) before addition of the sesquichloride was complete. When such addition was completed, the condenser was replaced with a small Vigreaux column and 86.7% of trimethylaluminum (based on the sesquichlorides) was recovered by distillation. However, the recovered product contained 5.1% chloride ion.

Example 2

A run was carried out in the manner of Example 1 except that a 5.4% excess (4.67 gram atoms) of sodium was used, and the methylaluminum sesquichlorides were added over a 50 minute period while maintaining the vessel contents at 120–150° C. An 88% yield of trimethylaluminum containing only 0.4% chlorides was obtained by distillation of the reaction mixture.

Example 3

A run was carried out in the manner of that of Example 2 except that the vessel was charged with 4.28 gram atoms of sodium following which the sodium was melted. To the molten metal, 1.3 moles of methylaluminum sesquichlorides were added and, from this run in which a 10% excess of sodium was used, trimethylaluminum was obtained in a 93.5% yield. The product trimethylaluminum contained a relatively low content of 0.43% of by-product chlorides.

*Example 4*

The following tabulation sets forth conditions employed, and product yields, from an additional number of runs carried out in accordance with the process embodied herein and in which runs a twenty gallon reactor was used provided with a rugged agitator that swept the bottom of the vessel and scraped the wall surfaces. The vessel was provided with a jacketed distillation column supplied with hot and cold coils, an inlet for feeding molten sodium, two sesquichloride feed inlets and a screw take off for removing by-product salt and aluminum. Included in the tabulation is a run in which a 22% excess of sodium was used and which, as shown, resulted in a lower yield of the desired trimethylaluminum product than was obtained in runs using an excess of sodium within the range embodied for practice of this invention.

| Total Sodium Added | | By-Product Salt or Salt-Aluminum Formed in Reactor, lbs. | Total Methyl Sesquichloride Addition, lbs. | Addition Time for Sesquichlorides (hrs.) | Temperature during Sesquichloride Addition, °C. | Percent Yield of Trimethyl Aluminum | Percent Cl- in Trimethyl Aluminum |
|---|---|---|---|---|---|---|---|
| lbs. | Percent excess | | | | | | |
| 11 | 14 | 20 | 28.6 | 6.5 | 160-180 | 93 | 0.3 |
| 5 | 4 | -------- | 14.3 | 4 | 150-160 | 92 | 0.3 |
| 12 | 8 | 30 | 32.9 | 6 | 175-190 | 100 | 0.5 |
| 1 232 | 9 | 540 | 630 | 386 | 150-200 | 95 | 0.8 |
| 5.5 | 22 | 10 | 13.2 | 4.5 | 150-160 | 78 | 0.5 |

1 Semi-continuous operation over a 20 day period.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process for preparation of trimethylaluminum which comprises reacting methylaluminum chloride with finely-divided, high surface sodium in an amount in excess, but not substantially more than about a 20% excess, of the amount of sodium theoretically required to convert said chloride to trimethylaluminum, at a temperature up to about 250° C.

2. A process, as defined in claim 1, wherein the reaction is carried out at a temperature above the boiling point of the methylaluminum chloride reactant and trimethylaluminum.

3. A process, as defined in claim 2, wherein the sodium reactant is in the form of finely dispersed particles of sodium.

4. A process, as defined in claim 1, wherein the sodium is in the form of a coating on finely divided particles of a solid inert to the reaction between methylaluminum chloride and sodium.

5. A process, as defined in claim 4, wherein the inert solid is sodium chloride.

6. A process for preparation of trimethylaluminum which comprises reacting methylaluminum sesquichlorides with finely divided sodium in an amount in excess, but not substantially more than about a 20% excess, of the amount theoretically required to convert said sesquichlorides to trimethylaluminum, at a temperature of from about 125° C. to about 200° C.

7. A process, as defined in claim 6, wherein the sodium reactant is in the form of particles of less than about 50 microns in size, and the trimethylaluminum is distilled as it forms by reaction of the sodium with the sesquichlorides.

8. A process, as defined in claim 6, wherein the sodium reactant is in the form of particles of less than about 50 microns, removal of trimethylaluminum from the reaction mixture is prevented while the reaction between the sodium and sesquichlorides is carried out, and the trimethylaluminum is recovered by subsequently subjecting the reaction mixture containing the trimethylaluminum to a temperature of from about 120 to 125° C. to distill off the trimethylaluminum.

9. A process, as defined in claim 6, wherein the sodium reactant is in the form of a coating on finely divided particles of a solid, inert to reactants and products, and the trimethylaluminum is distilled as it forms by reaction of the sodium with the sesquichlorides.

10. A process, as defined in claim 6, wherein the sodium reactant is in the form of a coating on finely divided particles of sodium chloride and the trimethylaluminum is distilled as it forms by reaction of the sodium with the sesquichlorides.

References Cited in the file of this patent

UNITED STATES PATENTS 2,838,556   Cottle _____ June 10, 1958

FOREIGN PATENTS 535,085   Belgium _____ July 22, 1955

OTHER REFERENCES

Grosse and Mavity: J. Organic Chemistry, vol. 5 (1940), pp. 106 to 121 (pp. 106, 119 and 120 particularly relied on).

Industrial and Engineering Chemistry, August 1951, pp. 1759 to 1760.